(12) United States Patent
Grant-Acquah

(10) Patent No.: US 7,025,823 B2
(45) Date of Patent: Apr. 11, 2006

(54) HIGH TEMPERATURE GASKET COATING

(75) Inventor: Frank Grant-Acquah, Hanover Park, IL (US)

(73) Assignee: Dana Corporation, Toledo, OH (US)

( * ) Notice: Subject to any disclaimer, the term of this patent is extended or adjusted under 35 U.S.C. 154(b) by 357 days.

(21) Appl. No.: 10/262,019

(22) Filed: Oct. 1, 2002

(65) Prior Publication Data

US 2004/0062936 A1    Apr. 1, 2004

(51) Int. Cl.
*C09D 5/46*    (2006.01)

(52) U.S. Cl. .............................. 106/287.14; 106/1.25; 508/167

(58) Field of Classification Search ........... 106/287.14, 106/1.25; 508/167
See application file for complete search history.

(56) References Cited

U.S. PATENT DOCUMENTS

| | | | | |
|---|---|---|---|---|
| 2,686,156 A | * | 8/1954 | Dupler et al. ............... | 508/167 |
| 3,384,588 A | * | 5/1968 | Chafetz et al. ............. | 508/208 |
| 3,429,261 A | * | 2/1969 | Goldstein ................... | 102/435 |
| 3,518,222 A | * | 6/1970 | Ostrowski ................... | 524/404 |
| 3,972,850 A | * | 8/1976 | Hamilton et al. ........... | 523/169 |
| 4,103,913 A | | 8/1978 | McDowell | |
| 4,202,780 A | * | 5/1980 | Brendle ...................... | 508/201 |
| 4,211,662 A | * | 7/1980 | King .......................... | 508/141 |
| 4,325,559 A | * | 4/1982 | Czernik et al. ............. | 277/592 |
| 4,731,189 A | * | 3/1988 | Gregg, Jr. ................... | 508/120 |
| 5,277,434 A | | 1/1994 | Kestly et al. | |
| 5,427,698 A | * | 6/1995 | Hirokawa et al. .......... | 508/106 |
| 5,490,681 A | | 2/1996 | Plunkett et al. | |
| 5,715,785 A | * | 2/1998 | Gregg, Jr. ............... | 123/196 R |
| 5,789,354 A | * | 8/1998 | Mikami et al. ............. | 508/201 |
| 5,924,701 A | | 7/1999 | Schweiger | |
| 5,951,021 A | | 9/1999 | Ueta | |
| 6,696,392 B1 | * | 2/2004 | Naik et al. .................. | 508/121 |

FOREIGN PATENT DOCUMENTS

CA          739905       *  8/1966
CA          739905       *  11/1966

* cited by examiner

*Primary Examiner*—Margaret G. Moore
(74) *Attorney, Agent, or Firm*—Rader, Fishman & Grauer, PLLC

(57) ABSTRACT

The present invention relates to a method of coating a gasket that includes electrostatically spraying a solvent-free coating material onto a grounded gasket and then fusing the material to itself and the gasket. In one aspect, a particulate lubricant and a silicone are used as the coating material.

2 Claims, 1 Drawing Sheet

HIGH TEMPERATURE GASKET COATING

FIELD OF THE INVENTION

This invention relates generally to improved metal gaskets and more particularly to high temperature coatings for metal gaskets.

BACKGROUND OF THE INVENTION

Gaskets are used in a variety of locations in internal combustion engines to create seals, such as where the exhaust manifold meets the engine block. The primary requirement of these gaskets is that they be able to maintain sealing capabilities at high operating temperatures of the engine. Known gaskets are typically made of one or more layers of steel or other high temperature inorganic materials such as mica. These multi-layer steel gaskets are often coated with a material that improves the heat and scuff resistance of steel.

Known coatings, however, are not cost effective to apply to metallic gaskets because they must be solubulized in a solvent and then sprayed or rolled onto the gasket. Solvent based coatings have significant drawbacks. For example, solvent based coatings may only be applied in an inefficient manner. Because the spray cannot easily be limited to the edges of the gasket, a significant amount of overspray results. The overspray material does not end upon the gasket and is thus wasted. Furthermore, overspray results in significant janitorial costs. Also, there are health concerns associated with the use of solvents. In addition, there are costs associated with the environmentally proper use and disposal of any solvent based coating, including those based on water.

The inventor has recognized a need for a coating material that overcomes one or more of these problems.

SUMMARY

The present invention relates to a method of coating a gasket that includes electrostatically spraying a solvent-free coating material onto a grounded gasket and then fusing the material to itself and the gasket. In one aspect, a particulate lubricant and a silicone are used as the coating material.

DETAILED DESCRIPTION

Figure 1:
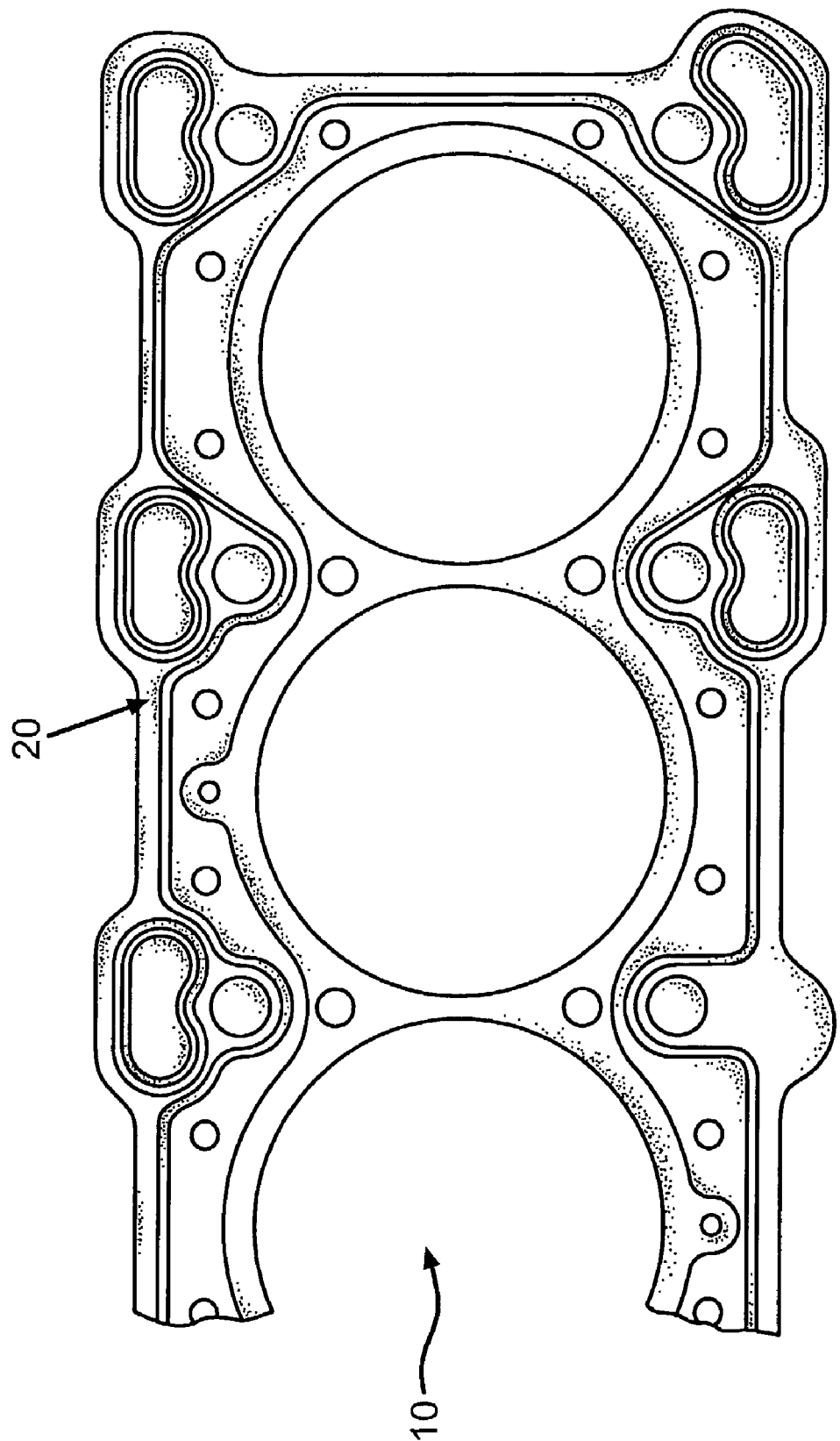
FIG. 1 shows a multilayer steel gasket that is suitable for having the present invention applied to it.

The present invention is directed to a coating composition for use on a metal gasket in vehicle engine. The composition, after it is applied, should be able to withstand the high operating temperatures of the vehicle engine without decomposing. FIG. 1 shows an exemplary multi-layer steel gasket 10 to which the coating composition 20 has been applied.

In accordance with the present invention, the coating composition is a solvent-free powder that induces a particulate lubricant and a carrier. The coating composition contains approximately 65–95 wt % of the particulate lubricant with the balance being the carrier. Preferred compositions contain approximately 70–80 wt % lubricant, with the most preferred composition containing approximately 75 wt % lubricant.

The particulate lubricant is selected for its resistance to high temperatures, as well as its scuff resistance. Known materials such as metallic, organic and inorganic carbides and nitrides are suitable particulate lubricants, as is graphite. However, metallic sulfides, and molybdenum disulfide in particular, are preferred.

The carrier is selected for its resistance to high temperatures, as well as its ability to adhere the particulate lubricant to itself and to the steel gasket. Silicone elastomers are well suited for use as carriers because of their adhesive properties and temperature resistance. In particular, polydimethylsiloxanes are preferred.

Combined, in the amounts illustrated above, the composition of the particulate lubricant and carrier achieve the requisite temperature and scuff resistances to provide a suitable coating to a steel gasket. This solvent-free coating is efficient to apply because any overspray can be reclaimed and reused. Further, overspray is reduced because, as described below, the solvent-free powder is drawn to the gasket during its application.

The composition of the present invention is made by mixing together powder forms of both the particulate lubricant and the carrier. A solvent is not required and the powders may be stirred until thorough mixing is achieved.

The present invention also includes a method of applying the inventive coating composition to a steel gasket. Combined, the particulate lubricant and the carrier create a solvent-free powdered composition that can be electrostatically sprayed onto a steel gasket. Generally, the process is as follows. The layers of the steel gasket are manufactured to shape and assembled as a gasket. The assembled gasket is next washed to remove any remnant grease from the manufacturing process. In a spray booth, or other suitable locations, the steel gasket is first connected to an electrical ground. The powdered (solvent-free) coating composition is then propelled toward the gasket by a spray gun. As the powder leaves the nozzle of the spray gun, it passes through an electric field that electrostatically charges the powder. The charged powder is drawn to the grounded steel gasket, where it adheres. After application of the coating, the steel gasket is then heat treated to fuse the coating to itself and the gasket. Typically, a temperature in the neighborhood of about 450° F. is used to fuse the coating for about 10 minutes.

Because the charged powder is electrically drawn to the grounded steel gasket, the amount of overspray is advantageously reduced. Thus, janitorial costs are reduced. In addition, since the electrostatic charging process does not chemically alter the coating composition, any overspray that does result can be collected and reused by mixing with the virgin coating composition. Preferably, the overspray is collected by a vacuum although it may be swept into a collection bin. Thus, the electrostatic spray reduces the overall cost of materials by reducing overspray while also allowing the reclamation of overspray. Together, through reduction in overspray and reclamation, up to 98% of the coating composition will be applied to the steel gasket. This compares favorably with solvent based coating compositions where as much as 60% of the coating composition is wasted. Furthermore, since the electrostatic spray method is solvent free, health and environmental concerns and costs associated with solvent based systems are greatly reduced, if not eliminated.

While the invention has been specifically described in connection with certain specific embodiments thereof, it is to be understood that this is by way of illustration and not of limitation, and the scope of the appended claims should be construed as broadly as the prior art will permit.

What is claimed is:

1. A coating composition comprising:

a solvent-free mixture of molybdenum disulfide and polydimethylsiloxane, wherein said solvent-free mixture is provided in the form of an electrostatically sprayable powder and wherein said solvent-free mixture includes about 70–80 wt % molybdenum disulfide.

2. The coating composition of claim 1 wherein said solvent-free mixture includes about 75 wt % molybdenum disulfide.

* * * * *